G. T. LEWIS.
Process of Making White Pigment from Lead Sulphurets.

No. 224,549. Patented Feb. 17, 1880.

UNITED STATES PATENT OFFICE.

GEORGE T. LEWIS, OF PHILADELPHIA, PENNSYLVANIA.

PROCESS OF MAKING WHITE PIGMENTS FROM LEAD SULPHURETS.

SPECIFICATION forming part of Letters Patent No. 224,549, dated February 17, 1880.

Application filed November 20, 1879.

*To all whom it may concern:*

Be it known that I, GEORGE T. LEWIS, of Philadelphia, county of Philadelphia, and State of Pennsylvania, have invented new and useful Improvements in the Manufacture of White Pigments from Powdered Galena or other Sulphureted Lead Ore, and of which the following is a specification.

Heretofore powdered galena or other sulphureted lead ore has been used in the manufacture of a white pigment by throwing it over a coal fire or into a flame of generator-gas. By this process carbonic-acid and carbonic-oxide gases from the combustion of the carbonaceous fuel become mixed with the lead-fumes and enter the catching apparatus, rendering the atmosphere about the bags very poisonous. A white pigment has also been made by exposing coarse or crushed galena to the joint action of heat and air in a kind of muffle-furnace, excluding the poisonous gases from the combustion of the fuel; but this is more expensive, and the galena when crushed does not burn, but melts, and is then volatilized.

My improvement consists in heating a retort or muffle externally and passing pulverized galena mixed with air into this retort, and collecting the resulting fumes in the cooling and catching apparatus.

Figure 1:
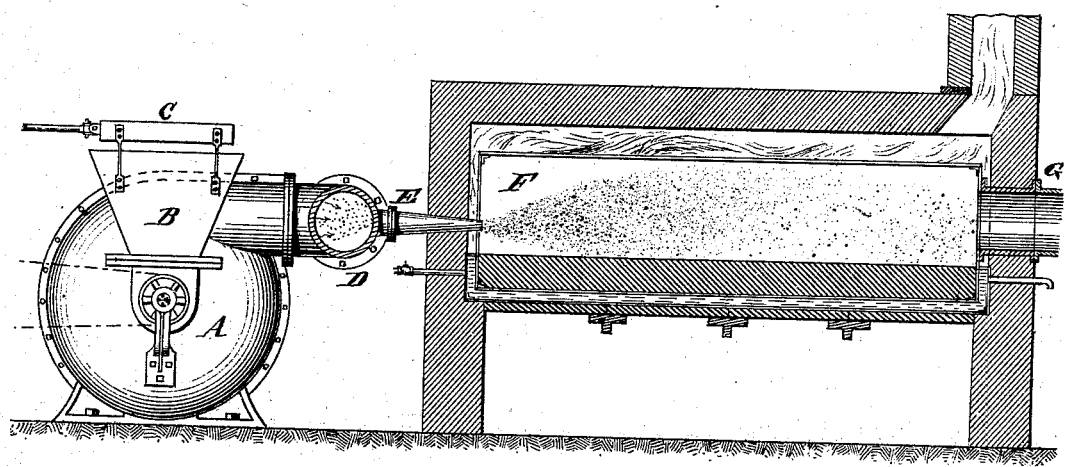
Figure 2:
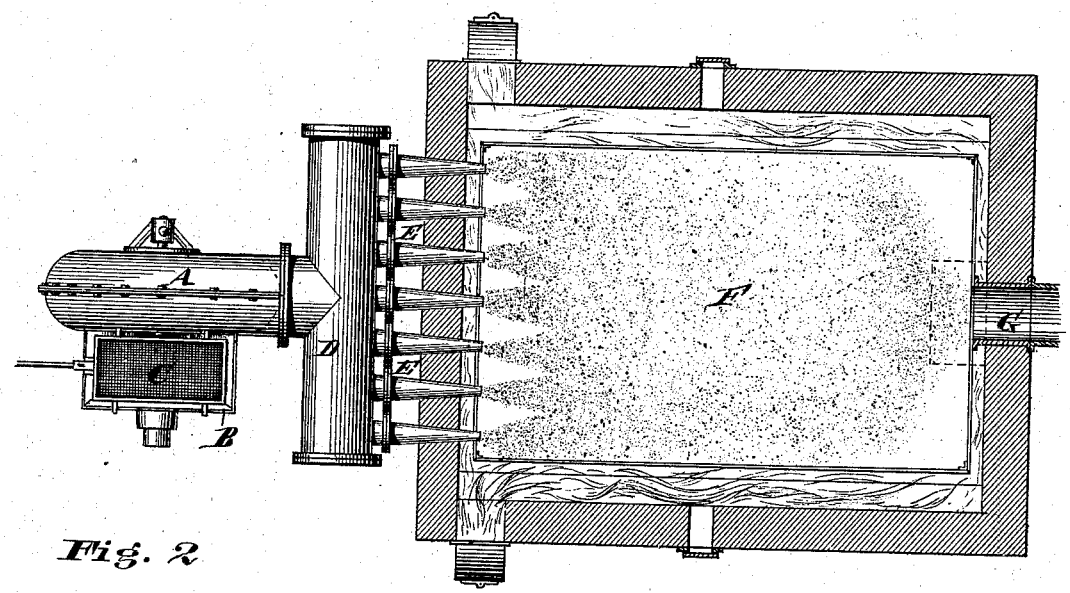

In the drawings, Figure 1 is a sectional elevation of a furnace and blowing apparatus adapted to my improved process. Fig. 2 is a sectional plan of same.

A is an ordinary blower. Situated on one side of the blower is a hopper, B, over which is a vibrated screen, C. Pulverized galena is thrown upon the screen C and passes into the hopper B, from which it is drawn, intimately mixed with air, and blown into the retort or muffle F by the tuyeres E. The retort F has a lead bottom, and is heated externally by any convenient means. In the drawings it is shown heated by gas. The pulverized galena mixed with air, in passing through the red-hot retort, is sublimed, and the fumes pass out by the flue G into the cooling and catching apparatus. When blown into a heated retort pulverized galena is sublimed at a low temperature, while crushed galena is not.

I claim—

The process of making white pigment by passing powdered galena or other sulphureted lead ore intimately mixed with air through retorts heated externally, and collecting the resulting fumes by means of cooling and catching apparatus, substantially as described.

In testimony of which invention I hereunto set my hand.

GEORGE T. LEWIS.

Witnesses:
  GORDON SECKEL,
  H. B. RIANHARD.